United States Patent [19]

Okada et al.

[11] Patent Number: 5,999,880
[45] Date of Patent: Dec. 7, 1999

[54] RELATIVE CAR POSITIONING SYSTEM USING CAR COMMUNICATION

[75] Inventors: Tsuyoshi Okada; Hisashi Kurokawa, both of Kanagawa; Masayuki Hamada, Tokyo, all of Japan

[73] Assignee: Matsushita Electric Industrial Co., Ltd., Osaka, Japan

[21] Appl. No.: 08/972,360

[22] Filed: Nov. 18, 1997

[30] Foreign Application Priority Data

Nov. 19, 1996 [JP] Japan ................................ 8-322144

[51] Int. Cl.$^6$ .................................................. G06F 165/00
[52] U.S. Cl. ........................ 701/213; 701/214; 701/215; 342/357.01; 342/357.06
[58] Field of Search ................................. 701/213, 214, 701/215, 216, 300; 342/357, 457, 352, 357.01, 357.06, 357.1; 455/3.2, 12.1, 13.2

[56] References Cited

U.S. PATENT DOCUMENTS

| | | | |
|---|---|---|---|
| 5,504,491 | 4/1996 | Chapman | 701/213 |
| 5,548,822 | 8/1996 | Yogo | 455/68 |
| 5,784,029 | 7/1998 | Geier | 701/214 |
| 5,786,790 | 7/1998 | Abbott | 701/214 |

*Primary Examiner*—Jacques H. Louis-Jacques
*Assistant Examiner*—Gertrude Arthur
*Attorney, Agent, or Firm*—McDermott, Will & Emery

[57] ABSTRACT

To cancel an error in GPS wave propagation time and calculate a relative position of a car running nearby to the own car position with good accuracy, a relative car positioning system using car communication includes a car communication transceiver, a GPS receiving device, a GPS information transmission/reception device, and a relative positioning device. A relative position is determined by determining a GPS wave propagation time difference from a GPS satellite, a wave of which is received by the car running nearby and the own car in common. The difference between the data of GPS wave propagation time at the car running nearby and the data of GPS wave propagation time at the own car is calculated, and if the number of differences of the GPS wave propagation time is obtained by more than three pieces, a relative position of the car running nearby is calculated by solving simultaneous equations expression the relative position as an unknown quantity.

17 Claims, 3 Drawing Sheets

RELATIVE CAR POSITIONING SYSTEM USING CAR COMMUNICATION

BACKGROUND OF THE INVENTION (1) Field of the Invention

The present invention relates to a relative car positioning system using car communication which exchanges information among nearby cars in order to support smooth and safe traffic and especially to a relative car positioning system using car communication which cancels an error of GPS wave propagation time and can accurately calculate a relative position of a nearby running car to the own car position.

(2) Description of the Prior Art

An apparatus built in a car communication application system used to support smooth and safe traffic is known as a usual relative car positioning system using car communication, as being disclosed, for example, in Japanese Patent Laid-Open 4-297000 (car group information collecting system by car communication), Japanese Patent Laid-Open 5-266399 (running control apparatus by car communication, etc.

An example of a relative car positioning system using car communication in accordance with the prior art is explained below, referring to the drawing.

FIG. 3 is a block diagram of a relative car positioning system using car communication in accordance with the prior art. A relative car positioning system is composed of a car communication transceiver 1, GPS receiving means 2, GPS information transmission/reception means 8 and relative positioning means by absolute position difference 9.

The function of a relative car positioning system using car communication in accordance with the prior art is explained below.

As a car communication transceiver 1, a transceiver module communicating data with a nearby running car is used, for example, using a millimeter band wave (30 to 300 GHz).

GPS receiving means 2 receives a wave transmitted from a plurality of GPS satellites in the sky and obtains wave propagation times from each GPS satellite to GPS receiving means 2, the position of each GPS satellite in the sky and the absolute position (for example, taking the center of the earth as an origin) of the GPS receiving means (in the own car) from the above information.

GPS information transmission/reception means 8 gives the own car position obtained at GPS receiving means 2 to car communication transceiver 1 as data for transmission, and car communication transceiver 1 transmits the data to every car running nearby. On the other hand, GPS information transmission/reception means 8 obtains an absolute position of each car calculated at the GPS receiving means of each car from car information obtained from every car running nearby through car communication transceiver 1 as GPS information.

Although the absolute position of each car running nearby is important, relations of relative positions between the own car and the cars running nearby are more important. Because, for example, whether the cars collide or not can be predicted from the relations of the relative positions.

Relative car positioning means by absolute position difference 9 calculates a relative position of the car running nearby to the own car position from the difference between the absolute position of each car calculated at GPS receiving means of each car and the absolute position of the own car obtained at GPS receiving means 2.

According to the above composition, the relative position of the car running nearby to the own car position can be known in real time and a relative car positioning system using car communication can be realized in which wide application such as safety and smoothness in traffic can be expected.

Although another method, such as using a car radar, can be used to obtain a relative distance, it is almost impossible to measure if an obstacle, such as the third car, comes to enter between the own car and the car running nearby. However, if a relative car positioning system using car communication is used, there is an advantage in which a position of the car running nearby, which is hard to measure even by a radar, can be obtained by using, for example a car running just ahead of the own car as a transponder.

In a relative car positioning system using car communication composed like the above, because the absolute position of each car is calculated independently at GPS receiving means of each car running nearby, an error occurs in the relative position of each car due to an error included in a GPS wave propagation time. As a result, the relative position of each car running nearby to the own car position is influenced by the error and a relative position with a good accuracy can not be obtained. This is a problem.

For example, in the case of not having compensation by a base station like DGPS, the position accuracy using a GPS cannot keep an accurate measurement of wave propagation time due to errors included in information transmitted from the GPS, and could have an absolute position error of up to 150 meters. Then, at worst, an error of 300 meters could occur as a relative position between two cars. Thus, it cannot be used at all for safety purposes, such as providing collision warnings.

Further, it sometimes could not be used for compensating a relative distance obtained by the other method, such as a car radar (which can usually detect with an accuracy of several meters if the target can be caught), because the accuracy is too bad.

The present invention is characterized by providing relative positioning means, utilizing GPS propagation time difference, which obtains a relative position of a car running nearby to the own car position by transmitting and receiving a wave propagation time from a GPS satellite to each car running nearby, and by transmitting and receiving information (ID or the like) of each of the GPS satellites. Not by transmitting and receiving absolute position data calculated independently among each of the cars. The differences between the GPS wave propagation time at each car running nearby and the GPS wave propagation time at the own car is calculated by solving simultaneous equations expressing relations between more than three pieces of GPS wave propagation time differences and a relative position as an unknown quantity.

Thus, the error of GPS wave propagation time is canceled and the relative position of the car running nearby to the own car position can be calculated with a good accuracy.

SUMMARY OF THE INVENTION

A relative car positioning system using car communication in accordance with a first exemplary embodiment of the present invention can transmit/receive or communicate between cars running nearby, and the own car and includes GPS receiving means for receiving the waves from GPS satellites; GPS information transmission/reception means for transmitting/receiving the information of the GPS satellites received at the GPS receiving means and the data of GPS wave propagation times from the GPS satellites to the cars for every satellite received through car communication means; and relative car positioning means by GPS wave propagation time differences for calculating differences between the data of GPS wave propagation times at the cars running nearby and the data of GPS wave propagation time at the own car obtained through the GPS information transmission/reception means for the GPS satellite, the wave of which is received by the cars running nearby and the own car in common, and calculating a relative position to the own car position by solving simultaneous equations expressing more than three pieces of GPS wave propagation time differences calculated and a relative position of the car running nearby as an unknown quantity. The system can cancel an error in GPS wave propagation time and can calculate the relative position of the car running nearby to the own car with a good accuracy.

A relative car positioning system using car communication in accordance with a second exemplary embodiment of the present invention can transmit/receive or communicate between cars running nearby and the own car and includes GPS receiving means for receiving the waves from GPS satellites; GPS information transmission/reception means for transmitting/receiving the information of the GPS satellites received at the GPS receiving means and the data of GPS wave propagation times from the GPS satellites to the cars for every satellite received through car communication means; and a first relative car positioning means for calculating differences between the data of GPS wave propagation times at the cars running nearby and the data of GPS wave propagation time at the own car obtained through the GPS information transmission/reception means for the GPS satellite, the wave of which is received by the cars running nearby and the own car in common and calculating a relative car position to the own car position by solving simultaneous equations expressing more than three pieces of GPS wave propagation time differences calculated and a relative car position of the car running nearby as an unknown quantity; a second relative car positioning means for calculating a relative position of the car running nearby to the own car by catching the car running nearby by a car radar and detecting a relative distance and a relative azimuth between the own car and the car running nearby; and search performance and accuracy improving means for improving the accuracy of relative car positioning by increasing detection sensitivity at the second relative car positioning means, increasing importance of the detection, or compensating the relative position calculated at the second relative car positioning means by the relative position calculated at the first relative car positioning means for the cars running nearby near the relative position calculated at the first relative car positioning means.

The system can improve the search performance and the accuracy of the car radar by effectively using the relative position information obtained by car communication.

DETAILED DESCRIPTION OF THE INVENTION

Figure 1:
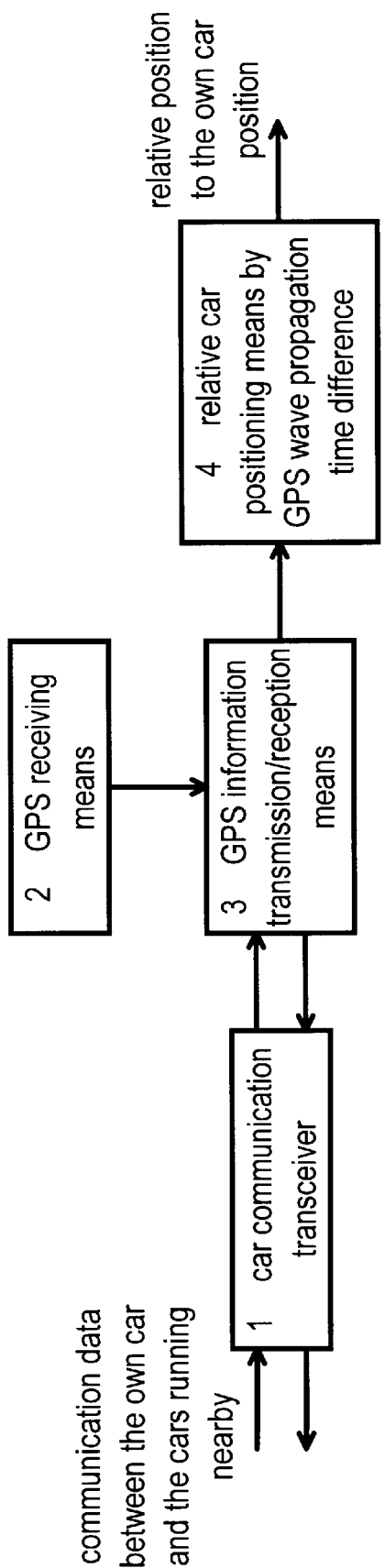
FIG. 1 is a block diagram of a relative car positioning system using car communication in accordance with a first exemplary embodiment of the present invention.

Exemplary embodiments of the present invention explained below, referring to the drawings.
First Exemplary Embodiment FIG. 1 is a block diagram of a relative car positioning system using car communication in accordance with a first exemplary embodiment of the present invention. The relative car positioning system is composed of a car communication transceiver 1, GPS receiving means 2, GPS information transmission/reception means 3 and relative car positioning means by GPS wave propagation time difference 4.

The function of a relative car positioning system using car communication in accordance with the first exemplary embodiment is explained below, referring to FIG. 1.

As a car communication transceiver 1, a transceiver module data communicating with cars running nearby by using, for example, a wave of millimeter band (30 to 300 GHz).

GPS receiving means 2 receives waves transmitted from a plurality of GPS satellites in the sky and calculates a wave propagation time from each GPS satellite to GPS receiving means 2, the position of each GPS satellite in the sky and from the above information, the absolute position of the GPS receiving means (in the own car), for example the absolute position taking the earth center as an origin.

GPS information transmission/reception means 3 gives not only the own car position data calculated at GPS receiving means 2, but also basic data used in the calculation process. For example, GPS information transmission/reception means 3 may give GPS wave propagation times between the GPS satellites and the own car, the IDs of the GPS satellites, and the present positions on the GPS orbits, and the like, for all the received GPS satellites, to car communication transceiver 1 as data for transmission. Additionally, car communication transceiver 1 may transmit the data to all of the cars running nearby.

On the other hand, GPS information transmission/reception means 3 receives basic data for calculating the present positions of the cars represented by the GPS wave propagation times from the GPS satellites to the own car, the IDs of the GPS satellites, and the present positions on the orbits of the GPS satellites, and the like, in the car information obtained from every car running nearby through car communication transceiver 1 as GPS information, as mentioned above.

Although the absolute position of each car running nearby is important, the relations between relative positions of the cars running nearby and the own car are more important, because whether they will collide or not can be predicated from the relations of the relative positions.

Relative car positioning means by GPS wave propagation time difference 4 extracts data from GPS satellites received commonly by the cars running nearby and the own car, and calculates differences between the data of the GPS wave propagation times at the cars running nearby and the data of the GPS wave propagation time at the own car for the GPS satellites in question. When the GPS wave propagation time differences are obtained for more than three GPS satellites, the relative position of the is car running nearby to the own car position is calculated by solving simultaneous equations, taking the relative position as an unknown quantity.

How to obtain a relative position of the car running nearby to the own car position is explained in detail, using equations.

Assuming the number of GPS satellites received commonly by the cars running nearby and the own car is n (n>4), the following relation is obtained about GPS wave propagation time pt obtained at GPS receiving means of the k-th car running nearby for the i-th satellite.

$$pt_k(i) = tpt_k(i) + ger(i) + cer_k, \quad \text{Eq. 1}$$

where tpt is a real GPS wave propagation time;

ger is a time error included each GPS satellite proper and SA (Selective Availability), which is willingly added, equivalently, and ger can be regarded as a common value in all the GPS receiving means of the own car and the cars running nearby, as mentioned later; and cer is an error included in GPS receiving means proper like a clock error at measuring a wave propagation time.

A similar relation exists about GPS wave propagation time pt obtained at GPS receiving means of the own car (suffix is m).

$$pt_m(i) = tpt_m(i1) + ger(i) + cer_m, \quad \text{Eq. 2}$$

where tpt is a real GPS wave propagation time;

ger is a time error included in each GPS satellite proper and SA, which is willingly is added, is also included in each GPS satellite equivalently; and cer is an error included in GPS receiving means proper like a clock error at measuring a wave propagation time.

Calculating GPS wave propagation time difference dpt between the car running nearby and the own car from Eqs. 1 and 2, $$\begin{aligned} dpt(i) &= pt_k(i) - pt_m(i) \quad \text{Eq. 3} \\ &= tpt_k(i) - tpt_m(i) + cer_k - cer_m \\ &= tdpt(i) + dcer, \end{aligned}$$

where tdpt is a real GPS wave propagation time difference; and dcer is an error difference included in GPS receiving means proper between the car running nearby and the own car.

Thus, the influence of the time difference included in each GPS satellite proper is canceled, because the distance between the car running nearby and the own car is several hundred meters at most, and the influence of the time difference included in each GPS satellite proper can be regarded equal between the cars running nearby and the own car, even if it is an influence of SA or an influence of ionosphere delay.

The following relation exists between real GPS wave propagation time difference tdpt(i) expressed by Eq. 3 and the relative position ($dx_m$, $dy_m$ and $dz_m$) of the car running nearby m to the own car position.

$$tdpt(i)*C = cx(i)*dx_m + cy(i)*dy_m + cz(i)*dz_m, \quad \text{Eq. 4}$$

where cx(i) is an azimuth cosine of an angle between the x-axis of the relative position coordinates and the line connecting the own car and the GPS satellite i;

cy(i) is an azimuth cosine of an angle between the y-axis of the relative position coordinates and the line connecting the own car and the GPS satellite i;

cy(i) is an azimuth cosine of an angle between the z-axis of the relative position coordinates and the line connecting the own car and the GPS satellite i; and c is speed of light.

However, because what actually obtained is not GPS wave propagation time difference tdpt(i) expressed by Eq. 3 but GPS wave propagation time difference dpt(i) including an error, $$dpt(i)*C = cx(i)*dx_m + cy(i)*dy_m + cz(i)*dz_m + dcer*C \quad \text{Eq. 5}$$

Because the number of unknown quantities is four, dxm, dym, dzm and dcer in Eq. 5, a relative position ($dx_m$, $dy_m$ and $dz_m$) can be calculated by solving simultaneous equations similar to Eq. 5 about more than four pieces of GPS satellites. (If the number of GPS satellites is four, the relative position is calculated by solving four simultaneous equations and if it is more than five, the relative position is usually calculated by least squares. Reference: for example, GPS" by Japan Geodesy Society)

It is possible to calculate from simultaneous equations for three GPS satellites, if the values cerk and cerm are previously known or they are negligible.

According to a relative car positioning system using car communication in accordance with the first exemplary embodiment of the present invention, a relative position of a car running nearby to the own car position can be calculated with a good accuracy even an error exists in a GPS wave propagation time.

Thus, according to the first exemplary embodiment of the present invention, an excellent relative car positioning system using car communication can be presented with a good accuracy even when an error exists in a GPS wave propagation time.

Second Exemplary Embodiment

Figure 2:
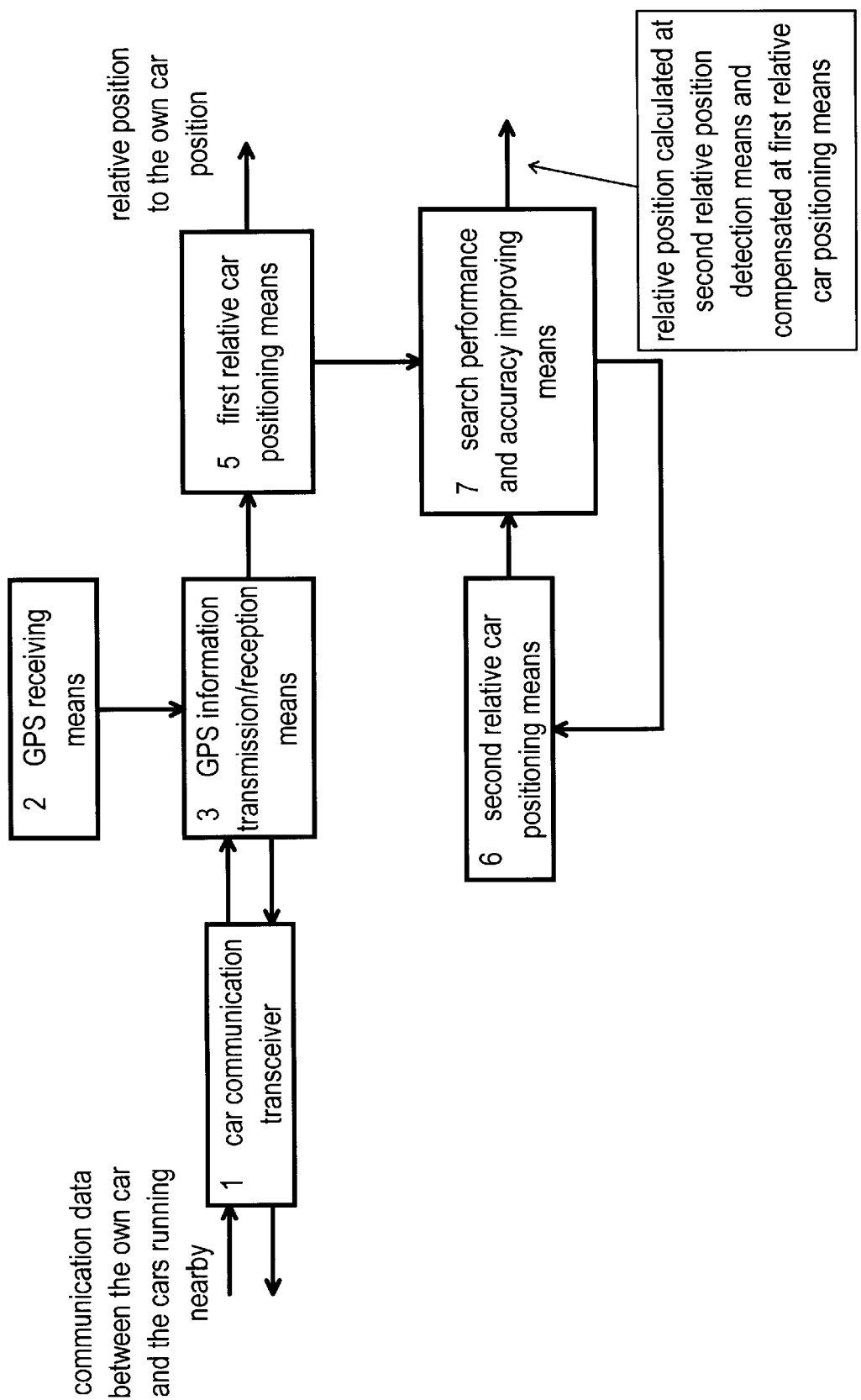
FIG. 2 is a block diagram of a relative car positioning system using car communication in accordance with a second exemplary embodiment of the present invention.
Figure 3:
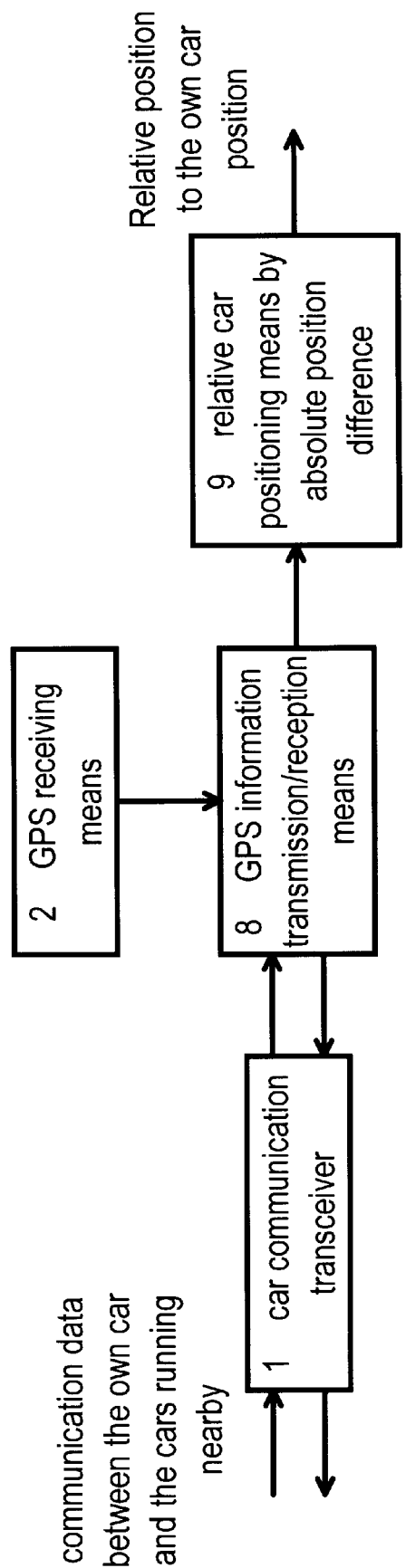
FIG. 3 is a block diagram of a relative car positioning system using car communication in accordance with the prior art.

FIG. 2 is a block diagram of a relative car positioning system using car communication in accordance with a second exemplary embodiment of the present invention. A relative car positioning system is composed of a car communication transceiver 1, GPS receiving means 2, GPS information transmission/reception means 3, first relative positioning means 5, second relative positioning means 6 and search performance/accuracy improving means 7.

The function of a relative car positioning system using car communication in accordance with the second exemplary embodiment is explained below, referring to FIG. 2. First relative car positioning means 5 is quite similar to relative car positioning means 4 by GPS wave propagation time difference explained in the first exemplary embodiment and the functions of car communication transceiver 1, GPS receiving means 2, GPS information transmission/reception means 3, first relative car positioning means 5 are similar to those of the first exemplary embodiment and their explanations are omitted.

A second relative car positioning means 6 may include, a pulse radar, an FM-CW radar, a pulse Doppler radar, or various other kinds of radar using electric waves (car radar is explained in detail, for example, in Research and development report of car radar" by Electric Wave System Development Center). In the case when there is almost no obstacle between the own car and the car running nearby, the relative distance between the own car and a car running nearby can be measured with a comparatively good accuracy and an acquired sample time can be smaller than in car communication. Accordingly, an advantage is that data closer to a real time can be obtained and it can be sufficiently used for car control. On the other hand, second relative car positioning means 6 has only a small output because it is for car use and if a millimeter band (3 to 300 GHz) is used in order to make the apparatus small, it is liable to be disturbed by radar interference of other cars, multipath interference or similar types of interference. As a result, some disadvantages could occur, for example, a car running nearby, which is to be detected, could not be detected because of too small of a signal level, or because it may disappear in an instant in spite of being detected once.

To avoid such a disadvantage, search performance/accuracy improving means 7 previously extracts a car surely detectable at second relative car positioning means 6 among cars which are running nearby, and calculates relative positions at first relative car positioning means 5, and gives directions to second relative car positioning means 6 to search, especially near the relative distance caught at first relative car positioning means 5.

For example, if second relative car positioning means 6 is a pulse radar, because a reflected pulse can be received with symmetry of a transmitted pulse when time which the electric wave travels on a distance, corresponding to twice that of a relative distance of the car running nearby, elapses, it is easy to find the car running nearby by gating only the time at the point and increasing the number of integrations, increasing the sensitivity, or decreasing a threshold value of target finding.

Even if the car running nearby, which is a target, is lost at second relative car positioning means 6, if the relative position is caught at first relative car positioning means 5, it is possible to compensate the relative position of the car running nearby at present, and always pursue the car running nearby. Additionally, because the accuracy of the relative position calculated at first relative car positioning means 5 is high, as explained in the first exemplary embodiment, the relative position can be calculated with a higher accuracy by averaging with second relative car positioning means 6 or forming a filter.

Because first relative car positioning means 5 can catch information of a car running nearby (outside of the range of the radar or behind another car) existing in a place which cannot be detected by second relative car positioning means 6, for example by using the car just ahead of the own car as a transponder, it is used in common with second relative car positioning means 6.

Thus, according to the second exemplary embodiment of the present invention, an excellent relative car positioning system using car communication, which can improve the accuracy of relative positioning of the car running nearby, can be presented, thereby improving search performance by a car radar, by combining information from car communication and information from a car radar.

As is obvious from the explanation of the above exemplary embodiments, an excellent relative car positioning system can be presented, which cancels an error in a GPS wave propagation time and can calculate relative position of a car running nearby to the own car position with good accuracy, even if an error exists in a wave propagation time.

Additionally, an excellent relative car positioning system can be presented, which can improve the accuracy of relative positioning of a car running nearby by improving search performance by a car radar and combining information from car communication and information from a car radar.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A relative car positioning system using car communication comprising:

GPS receiving means for receiving waves from GPS satellites;

GPS information transmission/reception means for transmitting and receiving GPS information received at said GPS receiving means and data of GPS wave propagation times from the GPS satellites to an own car about all the received satellites, between the own car and cars running nearby through car communication means; and relative car positioning means by GPS wave propagation time difference for calculating differences between data of GPS wave propagation times at the cars running nearby obtained through GPS information transmission/reception means contained in the cars running nearby and the data of GPS wave propagation time at the own car for the GPS satellites, the wave from which is being received simultaneously by the own car and the cars running nearby, and calculating relative positions of the cars running nearby to the own car position by solving simultaneous equations expressing relations between more than three pieces of GPS wave propagation time differences calculated above and a relative position as an unknown quantity; and wherein data transmission/reception to/from and communication with the cars running nearby are possible.

2. The relative car positioning system according to claim 1, wherein the relative car positioning means calculates the difference between the wave propagation time at the own car and the wave propagation time in the cars running nearby by canceling the influence of a time difference included in each GPS satellite.

3. The relative car positioning system according to claim 1, wherein the relative car positioning means calculates a difference between the wave propagation time at the own car and the wave propagation times at the cars running nearby according to the equation:

$$dpt = tdpt(i) + dcer,$$

where:

dpt is the wave propagation time difference between a car running nearby and the own car;

tdpt is a real GPS wave propagation time difference; and dcer is an error difference included in a GPS receiving means in a car running nearby and the GPS receiving means.

4. A relative car positioning system using car communication comprising:

GPS receiving means for receiving waves from GPS satellites;

GPS information transmission/reception means for transmitting and receiving GPS information received at said GPS receiving means and data of GPS wave propagation times from the GPS satellites to an own car about all the received GPS satellites, between the own car and cars running nearby through car communication means;

first relative car positioning means by GPS wave propagation time difference for calculating differences between data of GPS wave propagation times at the cars running nearby obtained through GPS information transmission/reception means contained in the cars running nearby and the data of GPS wave propagation time at the own car for the GPS satellites, the wave from which is being received simultaneously by the own car and the cars running nearby, and calculating relative positions of the cars running nearby to the own car position by solving simultaneous equations expressing relations between more than three pieces of GPS wave propagation time differences calculated above and a relative position as an unknown quantity;

second relative car positioning means for calculating a relative position of the cars running nearby to the own car position by catching the cars running nearby by a car radar and detecting relative distances and relative azimuth between the own car and the cars running nearby; and search performance/accuracy improving means for improving the accuracy of relative positioning by increasing detection sensitivity at said second relative car positioning means, increasing importance of a detection and compensating the relative position calculated at said second relative car positioning means by the relative position calculated at said relative car positioning means for the cars running nearby near the relative position calculated at said first relative car positioning means; and wherein data transmission/reception to/from and communication with the cars running nearby is possible.

5. The relative car positioning system according to claim 4, wherein the first relative car positioning means calculates the difference between the wave propagation time at the own car and the wave propagation time in the cars running nearby by canceling the influence of a time difference included in each GPS satellite.

6. The relative car positioning system according to claim 4, wherein the first relative car positioning means calculates a difference between the wave propagation time at the own car and the wave propagation time in the cars running nearby according to the equation:

$$dpt=tdpt(i)+dcer,$$

where:
dpt is the wave propagation time difference between a car running nearby and the own car;
tdpt is a real GPS wave propagation time difference; and
dcer is an error difference included in a GPS receiver in a car running nearby and the GPS receiving means.

7. A relative positioning system comprising:
a first GPS receiver which receives information from a plurality of GPS satellites and determines a first wave propagation time, said first propagation time being a propagation time of a wave from at least one GPS satellite, of said plurality of GPS satellites, to said first GPS receiver;
a communicator which receives information from nearby GPS receivers, including nearby wave propagation times, said nearby wave propagation times being propagation times of the wave from said at least one GPS satellite, of said plurality of GPS satellites, to each receiver of said nearby GPS receivers; and
a calculator which determines the relative position of the first GPS receiver to the nearby GPS receivers by calculating a difference between the first wave propagation time and the nearby wave propagation times, wherein said calculator calculates the relative position by solving simultaneous equations expressing relations between more than three calculations of difference in the first wave propagation time and the nearby wave propagation times.

8. The relative positioning system according to claim 7, wherein said first propagation time and said nearby propagation times are determined from the propagation times of waves from a plurality of satellites.

9. The relative positioning system according to claim 7, further comprising:
a transceiver, and
wherein said communication device receives GPS information received at said nearby GPS receivers through said transceiver.

10. The relative positioning system according to claim 7, wherein the calculator calculates the difference between the first wave propagation time and the nearby wave propagation times by canceling the influence of a time difference included in said at least on GPS satellite of said plurality of satellites.

11. The relative car positioning system according to claim 7, wherein the calculator calculates the difference between the first wave propagation time and the nearby wave propagation times according to the equation:

$$dpt=tdpt(i)+dcer,$$

where:
dpt is the wave propagation time difference between the nearby GPS receivers and the first GPS receiver;
tdpt is a real GPS wave propagation time difference; and
dcer is an error difference included in a nearby GPS receiver and the first GPS receiver.

12. The relative positioning system according to claim 7, further comprising:
a distance detector which detects the distance between an object carrying said first GPS receiver and objects carrying said nearby GPS receivers; and
a controller which controls the distance detector based on the relative position determination of said calculator.

13. The relative positioning system according to claim 12, wherein said controller controls the distance detector to search for an object carrying a nearby GPS receiver near the relative distance calculated by said calculator.

14. The relative positioning system according to claim 12, wherein said controller controls the distance detector to increase the sensitivity of the distance detector.

15. The relative positioning system according to claim 12, wherein said controller controls the distance detector to decrease a threshold detection value of the distance detector.

16. A relative positioning method comprising the steps of:
receiving information from a plurality of GPS satellites and determining a first wave propagation time, said first propagation time being a propagation time of a wave from at least one GPS satellite, of said plurality of GPS satellites, to a first GPS receiver;
receiving information from nearby GPS receivers, including nearby wave propagation times, said nearby propagation times being propagation times of a wave from said at least one GPS satellite, of said plurality of GPS satellites, to said nearby GPS receivers; and
determining the relative position of the first GPS receiver and the nearby GPS receivers by calculating a difference between the first wave propagation time and the nearby wave propagation times, and by solving simultaneous equations expressing relations between more than three calculations of differences between the first wave propagation time and the nearby wave propagation times.

17. The relative positioning method according to claim 16, further comprising the steps of:

detecting the distance between an object carrying said first GPS receiver and objects carrying said nearby GPS receivers by a distance detector; and controlling the distance detector based on the relative position determination of the first GPS receiver and the nearby GPS receivers.

* * * * *